Patented June 27, 1933

1,915,901

UNITED STATES PATENT OFFICE

ARTHUR GEORGE PERKIN, OF LEEDS, ARNOLD SHEPHERDSON, OF CHORLTON-CUM-HARDY, MANCHESTER, AND NORMAN HULTON HADDOCK, OF PRESTWICH, MANCHESTER, ENGLAND, ASSIGNORS TO IMPERIAL CHEMICAL INDUSTRIES LIMITED, OF WESTMINSTER, ENGLAND

MANUFACTURE OF VAT DYES

No Drawing. Application filed April 9, 1931, Serial No. 528,972, and in Great Britain April 17, 1930.

This invention relates to the manufacture of vat dyes; and it comprises processes wherein a hydroxylated anthranol is reacted with an alkylating agent and a tetrahalogenothiophen, the alkylating agent and the tetrahalogenothiophen being either simultaneously or successively reacted with the anthranol, and it further comprises the vat dyestuffs thus obtained; all as more fully hereinafter set forth and as claimed.

We have found that when a hydroxylated anthraquinone, e. g. alizarin, is first reduced to the corresponding anthranol having the probable formula:

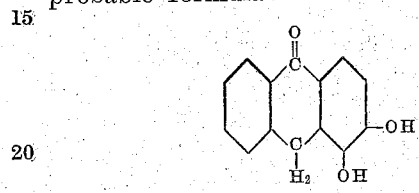

and then heated in an inert medium acting as a solvent or diluent, e. g. trichlorobenzene or naphthalene, with a tetrahalogenothiophen, for example, tetrachlorothiophen, and an alkylating agent, e. g. dimethyl sulphate and with the addition, if desired of an acid binding agent such as sodium carbonate, then interaction of the anthranol with the tetrahalogenothiophen accompanied by alkylation, takes place and we obtain valuable new vat dyes.

We have further found that these new dyestuffs may be also obtained by reacting a tetrahalogenothiophen with a hydroxy-alkyloxyanthranol. Either tetrachlorothiophen or tetrabromothiophen may be advantageously used as the tetrahalogenothiophen compound. As the hydroxyalkoxyanthranol compound, 4-hydroxy-3-alkoxyanthranol having the probable formula:

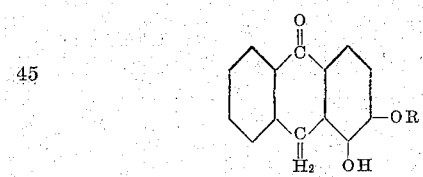

wherein R represents an alkyl group, is advantageous in our process.

Our invention thus comprises the production of new vat dyes by interaction, simultaneously with or subsequent to alkylation, of a hydroxylated anthranol with tetrahalogenothiophen. When we apply our invention to, for example, the dihydroxyanthranol obtained from alizarin we produce a beautiful green dye having among other valuable properties an excellent fastness to chlorine; we obtain a similar dye when, without simultaneous alkylation, we treat, for example, 4-hydroxy-3-methoxyanthranol with tetrachlorothiophen. The product may be halogenated to produce further new vat dyes.

The processes given ante all produce valuable dyestuffs. These dyestuffs may be represented by the probable formula:

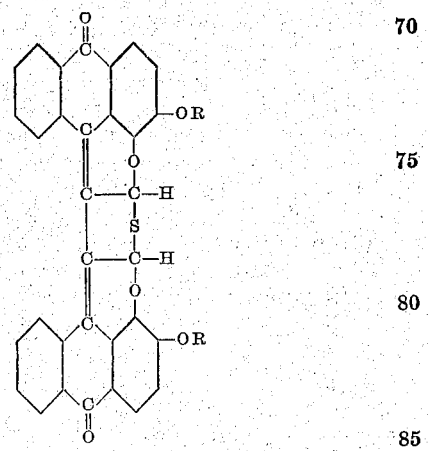

wherein R represents an alkyl group. From their structure it will be seen that these dyestuffs may be considered as compounds obtainable by reacting a hydroxylated anthranol compound having the probable formula:

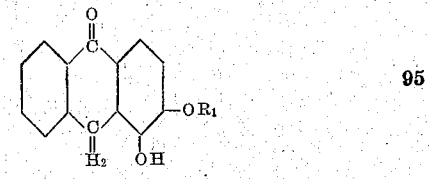

wherein $R_1$ represents hydrogen or an alkyl group, a tetrahalogenothiophen, the alkyl group, if not present in the starting material, being introduced by the alkylating agent during the reaction.

Our invention is illustrated but not limited by the following examples, in which the parts are by weight.

Example 1

27.5 parts of alizarine, 250 parts of zinc dust, 2500 parts of water and 350 parts of ammonia (specific gravity 0.880) are mixed together and heated to boiling with vigorous stirring during ¾ hour. The reaction mixture is filtered and the filtrate run into a mixture of 2000 parts of 35 per cent hydrochloric acid and 3000 parts of water. This procedure effects precipitation of the anthranol compound. The anthranol is filtered off, washed until free from acid, and dried in a vacuum at 100° C. The anthranol thus obtained may be represented by the probable formula:

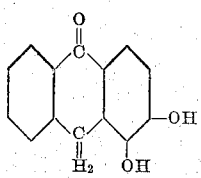

20 parts of the dry powder so obtained are mixed with 400 parts of commercial trichlorobenzene, which contains tetrachlorothiophen, 30 parts of dry sodium carbonate, and 30 parts of dimethyl sulphate. The mixture is heated, with good stirring, to 190–200° C. for 3 hours. The product is filtered off after cooling and washed with methylated spirit and water. It is a dark green powder, soluble with a bright red colour in sulphuric acid, and yielding a bluish-green vat, from which cotton is dyed in bright emerald green shades. The dyestuffs may be represented by the following probable formula:

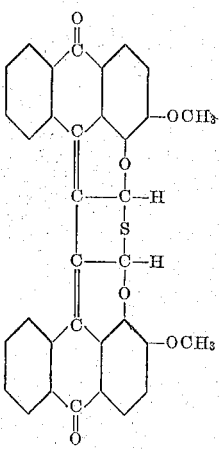

Example 2

5 parts of the anthranol prepared as in Example 1, 5 parts of tetrachlorothiophen, 50 parts of naphthalene, 7.5 parts of dimethyl-sulphate, and 7.5 parts of dry sodium carbonate, are mixed together and heated to boiling with good stirring for 6 hours. The mixture is cooled, and hot benzene is added. It is again cooled and worked up as in Example 1.

Example 3

5 parts of 4-hydroxy-3-methoxyanthranol having the probable formula:

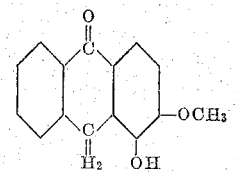

5 parts of tetrachlorothiophen and 50 parts of naphthalene are mixed and heated to boiling for 6 hours. The mixture is cooled, and hot benzene is added. It is again cooled and the product is filtered off and washed with benzene. The vat dyestuffs thus obtained may be represented by the probable formula:

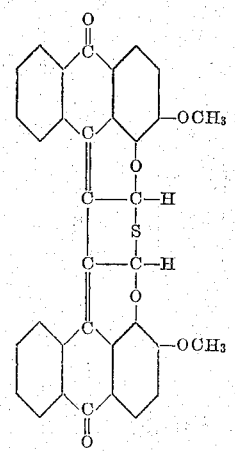

Example 4

10 parts of 4-hydroxy-3-methoxyanthranol, 10 parts of tetrabromothiophen and 100 parts of naphthalene are mixed and boiled under reflux for 5 hours. After cooling to 100° C. 200 parts of boiling benzol are added. The hot mixture is filtered and the residue washed with hot benzol until all naphthalene is removed. The product so obtained is identical with that of Examples 1, 2 and 3.

As many apparently widely different embodiments of this invention may be made without departing from the spirit and scope thereof, it is to be understood that we do not intend to limit ourselves to the specific embodiments thereof except as indicated in the appended claims.

We claim:

1. In the manufacture of vat dyestuffs, the process which comprises reacting a hydroxylated anthranol having the probable formula

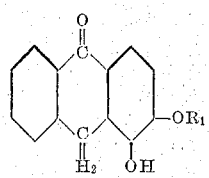

wherein $R_1$ represents hydrogen or a methyl group with a dimethyl sulphate and a tetrahalogenothiophen.

2. The process of claim 1 in which said tetrahalogenothiophen is tetrachlorothiophen.

3. The process of claim 1 in which the reaction with the dimethyl sulphate and the tetrahalogenothiophen are simultaneously effected.

4. The process of claim 1 in which the reaction with the dimethyl sulphate and the tetrahalogenothiophen are successively effected.

5. The process of claim 1 in which the reaction is effected in the presence of an inert solvent or diluent.

6. In the manufacture of vat dyes, the step which comprises reacting a hydroxylated anthranol compound having the probable formula:

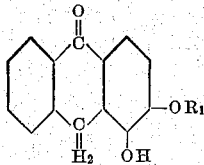

wherein $R_1$ represents hydrogen or a methyl group with a tetrahalogenothiophen.

7. In the manufacture of vat dyes, the process which comprises simultaneously reacting 3:4-dihydroxyanthranol with dimethyl sulphate and a tetrahalogenothiophen.

8. The process of claim 7 in which the said tetrahalogenothiophen is tetrachlorothiophen.

9. In the manufacture of vat dyes, the process which comprises mixing together 3:4-dihydroxyanthranol, dimethyl sulphate and tetrachlorothiophen in an inert medium, heating the mixture thus obtained until reaction is effected, and isolating and recovering the vat dyestuffs thus produced.

10. The process of claim 9 in which said inert medium is naphthalene.

11. In the manufacture of vat dyestuffs, the process which comprises reducing alizarin to the corresponding hydroxylated anthranol, mixing the anthranol compound thus obtained with trichlorbenzene, dimethyl sulphate, and tetrachlorothiophen, heating the mixture to a temperature between 190 to 200° C. until reaction is effected and isolating the vat dyestuffs thus obtained.

12. In the manufacture of vat dyes, the process which comprises reacting 4-hydroxy-3-methylanthranol with a tetrahalogenothiophen in the presence of an inert medium and isolating the vat dyestuff thus obtained.

13. The process of claim 12 in which said inert medium is naphthalene.

14. The process of claim 12 in which said tetrahalogenothiophen is tetrabromothiophen.

15. The process of claim 12 in which said tetrahalogenothiophen is tetrachlorothiophen.

16. In the manufacture of vat dyestuffs, the process which comprises mixing together 4-hydroxy-3-methoxyanthranol and tetrachlorothiophen with naphthalene, heating the mixture until reaction is effected, cooling the reaction mixture and adding hot benzene, filtering off the vat dyestuff thus obtained and washing the vat dyestuff thus obtained with benzol.

17. As new products, vat dyestuffs having the probable formula:

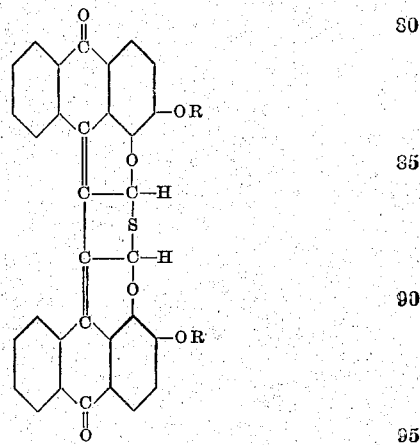

wherein R represents an hydrogen or a methyl group, said dyestuffs being dark green powders soluble with a bright red color in sulphuric acid and yielding a bluish-green vat from which cotton is dyed in bright emerald-green shades.

18. As a new product, a vat dyestuff having the probable formula:

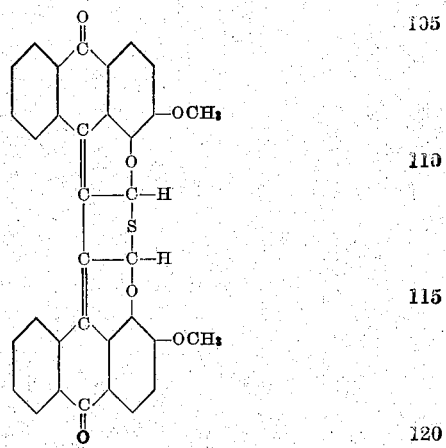

said vat dyestuff being a dark green powder soluble with a bright red color in sulphuric acid and yielding a bluish-green vat from which cotton is dyed in bright emerald-green shades.

In testimony whereof we affix our signatures.

ARTHUR GEORGE PERKIN.
ARNOLD SHEPHERDSON.
NORMAN HULTON HADDOCK.